United States Patent [19]

Fujioka et al.

[11] 4,394,177
[45] Jul. 19, 1983

[54] COATING COMPOSITION

[75] Inventors: Akira Fujioka, Osaka; Kazuo Sakiyama, Ibaraki; Akio Takigawa; Motoaki Yoshida, both of Nishinomiya, all of Japan

[73] Assignees: Sumitomo Chemical Company, Limited; Nippon Sheet Glass Co. Ltd., both of Osaka, Japan

[21] Appl. No.: 222,565

[22] Filed: Jan. 5, 1981

[30] Foreign Application Priority Data

Jan. 10, 1980 [JP] Japan .................................. 55-1532

[51] Int. Cl.$^3$ .............................................. C09K 3/00
[52] U.S. Cl. ........................... 106/287.14; 106/287.16
[58] Field of Search ....................... 106/287.14, 287.16

[56] References Cited

U.S. PATENT DOCUMENTS

| | | | |
|---|---|---|---|
| 3,961,977 | 6/1976 | Koda et al. | 106/287 SB |
| 3,986,997 | 10/1976 | Clark | 260/29.2 M |
| 4,173,490 | 11/1979 | Rotenberg et al. | 106/187.14 |
| 4,229,228 | 10/1980 | Rotenberg et al. | 106/187.14 |
| 4,337,107 | 6/1982 | Eshleman | 156/249 |

Primary Examiner—Allan Lieberman
Assistant Examiner—Patricia Short
Attorney, Agent, or Firm—Gordon W. Hueschen

[57] ABSTRACT

A coating composition, which comprises: (A) at least one hydrolyzate selected from the group of epoxy group-containing silicon compounds, (B) at least one member selected from the group consisting of hydrolyzates of organic silicon compounds, colloidal silica and organic titanium compounds, and (C) a curing catalyst.

12 Claims, No Drawings

COATING COMPOSITION

BACKGROUND OF THE INVENTION

1. Field of the Invention

This invention relates to a coating composition. More particularly, this invention relates to a coating composition for improving articles of plastic materials, articles of wooden materials and articles of metallic materials in surface conditions such as surface rigidity, chemical resistance and dyeability.

2. Description of Prior Arts

Shaped articles of plastic materials, i.e. shaped articles of thermoplastic resins such as, for example, polycarbonate, polymethyl methacrylate, polystyrene and polyvinyl chloride excel in transparency, freedom from weightness, ease of fabrication and impact resistance. They nevertheless lack abrasion resistance and solvent resistance and, therefore, tends to sustain scratches on the surface and readily yield to the action of organic solvents. To remedy the drawback, there have been suggested various methods for coating such articles with thermosetting resins. None of these methods, however, have provided any satisfactory remedy although one is needed.

For example, combinations of trialkoxysilanes such as methyl trialkoxysilanes and phenyl trialkoxysilanes and tetraalkoxysilanes such as ethyl silicate and butyl silicate, and mixtures of such combinations with other resinous coating compositions have been suggested as coating compositions. Unfortunately, none of them satisfy all the properties such as abrasion resistance, adhesiveness, hot water resistance, heat resistance and weather resistance. Japanese Laid-open Patent Publication No. 42,752/1976 and Japanese Patent Publication No. 13,818/1977 disclose inventions which involve epoxy group-containing alkoxy-silanes and adopt, as curing catalysts therefore, Lewis acids such as $BF_3$ and $BF_3$ etherates or complexes of such acids, Br φ sted acids such as HCl, HBr, HI, $HNO_3$, $HClO_4$ and $H_3PO_4$ and metal salts of organic acids such as cobalt naphthenate and zinc naphthenate. These methods, however, are not practicable because the produced coating compositions have a short pot life and require a long curing time. Japanese Laid-open Patent Publication No. 117,529/1974 discloses compositions comprising epoxy group-containing alkoxysilanes and zinc borofluoride, tin borofluoride or boron trifluoride-amine complex. The method taught in this disclosure, however, does not impart ample rigidity to the formed coat. The coat obtained at all by this method is degraded during its exposure to hot water. U.S. Pat. No. 3,986,997 discloses a coating composition comprising coloidal silica and hydrolyzate of methyltrimethoxysilane as a main component. Although the cured coating film has sufficient hardness, it has poor flexibility, and it is very difficult to obtain good adhesiveness to the polycarbonate type resin substrate. Japanese Laid-open Patent Publication No. 111,336/1978 discloses coating compositions comprising one or more of mixtures selected from compounds containing epoxy group and silanol group and/or siloxane group and finely divided silica having a particle diameter of from 1 to 100 milimicrons and an aluminum chelate compound, but the cured coated film has poor hardness and the hardness is impaired by boiling, dipping into water and the like, and further, it exhibits poor adhesiveness to diethylene glycol (CR-39) bisphenol type polycarbonate substrate.

Further, when the surface coating treatment is applied to a plastic eye glass lens and the like, it is desired to be easy to dye the formed coated film, but the coated film having surface hardness has generally poor dyeability. Thus, according to usual dyeing method which is widely used to dye fibers and plastics, it is impossible to dye or even if it is possible to dye, the coated film decreases in hardness and performances on account of severe dyeing conditions. U.S. Pat. No. 4,173,490 discloses a coating composition which comprises a cohydrolyzate of ethyl silicate and alkyl trialkoxysilane and/or dialkyl dialkoxysilane modified with a siloxane having active polar group or a nonionic surface active agent in order to be able to dye, but the cured coated film is easy to crack and has poor dyeability.

It is therefore, an object of this invention to provide a coating composition which excels in abrasion resistance, hot water resistance, adhesiveness and weather resistance and enjoys a long pot life.

SUMMARY OF THE INVENTION

The object described above is accomplished by a coating composition, which comprises:

(A) at least one hydrolyzate selected from the group of epoxy group-containing silicon compounds represented by the general formula (1):

wherein, $R^1$ stands for an organic group containing an epoxy group, $R^2$ for a hydrocarbon group having 1 to 6 carbon atoms or vinyl group, $R^3$ for a hydrocarbon group having 1 to 5 carbon atoms, alkoxyalkyl group or acyl group having 1 to 4 carbon atoms, a for an integer of 1 to 3 and b for an integer of 0 to 2, providing that $a+b \leq 3$ is satisfied, said one hydrolyzate being used in an amount of 100 parts by weight (of solids, calculated as

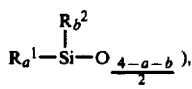

(B) at least one member selected from the group consisting of hydrolyzates of organic silicon compounds represented by the general formula (2):

wherein, $R^4$ stands for a hydrocarbon group having 1 to 6 carbon atoms, vinyl group, methacryloxy group, amino group, mercapto group, or organic group containing fluorine or chlorine, $R^5$ for a hydrocarbon group having 1 to 5 carbon atoms, alkoxyalkyl group or acyl group having 1 to 4 carbon atoms and c for an integer of 0 to 3, colloidal silica and organic titanium compounds, said one member being used in an amount within the range of from 1 to 567 parts by weight [of solids, calculated as $R_c^4-Si-O_{4-c/2}$ in the case of an organic silicon compound represented by the general formula (2), as $SiO_2$ in the case of colloidal silica or as $R_d^6-Ti-O_{(4-d)/2}$ in the case of an organic titanium compound, wherein, $R^6$ stands for an unhydrolyzed group containing no hydroxyl group and d for an integer of 1 to 4], and
(C) a curing catalyst.

PREFERRED EMBODIMENT OF THE INVENTION

Examples of epoxy group-containing silicon compounds which are usable in the present invention as the component (A) represented by the general formula (1) are shown below. Typical silicon compounds containing one glycidoxy group are as follows:

Glycidoxymethyl trimethoxysilane
Glycidoxymethyl triethoxysilane
β-Glycidoxyethyl trimethoxysilane
β-Glycidoxyethyl triethoxysilane
γ-Glycidoxypropyl trimethoxysilane
γ-Glycidoxypropyl triethoxysilane
γ-Glycidoxypropyl tri(methoxyethoxy)silane
γ-Glycidoxypropyl triacetoxysilane
δ-Glycidoxybutyl trimethoxysilane
δ-Glycidoxybutyl triethoxysilane
Glycidoxymethyl dimethoxysilane
Glycidoxymethyl(methyl) dimethoxysilane
Glycidoxymethyl(ethyl) dimethoxysilane
Glycidoxymethyl(phenyl) dimethoxysilane
Glycidoxymethyl(vinyl) dimethoxysilane
Glycidoxymethyl(dimethyl) methoxysilane
β-Glycidoxyethyl(methyl) dimethoxysilane
β-Glycidoxyethyl(ethyl) dimethoxysilane
β-Glycidoxyethyl(dimethyl) methoxysilane
γ-Glycidoxypropyl(methyl) dimethoxysilane
γ-Glycidoxypropyl(ethyl) dimethoxysilane
γ-Glycidoxypropyl(dimethyl) methoxysilane
δ-Glycidoxybutyl(methyl) dimethoxysilane
δ-Glycidoxybutyl(ethyl) dimethoxysilane
δ-Glycidoxybutyl(dimethyl) methoxysilane Typical silicon compounds containing two or three glycidoxy groups are as follows:

Bis-(glycidoxymethyl) dimethoxysilane
Bis-(glycidoxymethyl) diethoxysilane
Bis-(glycidoxyethyl) dimethoxysilane
Bis-(glycidoxyethyl) diethoxysilane
Bis-(glycidoxypropyl) dimethoxysilane
Bis-(glycidoxypropyl) diethoxysilane
Tris-(glycidoxymethyl) methoxysilane
Tris-(glycidoxymethyl) ethoxysilane
Tris-(glycidoxyethyl) methoxysilane
Tris-(glycidoxyethyl) ethoxysilane
Tris-(glycidoxypropyl) methoxysilane
Tris-(glycidoxypropyl) ethoxysilane Typical glycidyl group-containing silicon compounds are as follows:

Glycidylmethyl trimethoxysilane
Glycidylmethyl triethoxysilane
β-Glycidylethyl trimethoxysilane
β-Glycidylethyl triethoxysilane
β-Glycidylpropyl trimethoxysilane
γ-Glycidylpropyl triethoxysilane
γ-Glycidylpropyl tri(methoxyethoxy)silane
γ-Glycidylpropyl triacetoxysilane Typical alicyclic epoxy group-containing silicon compounds are as follows:

3,4-Epoxycyclohexylmethyl trimethoxysilane
3,4-Epoxycyclohexylmethyl triethoxysilane
3,4-Epoxycyclohexylethyl trimethoxysilane
3,4-Epoxycyclohexylpropyl trimethoxysilane
3,4-Epoxycyclohexylbutyl trimethoxysilane Examples of organic silicon compounds which are usable in the present invention as one of the group of components (B) represented by the general formula (2) are trimethyl methoxysilane, dimethyl dimethoxysilane, methyl trimethoxysilane, tetraethoxysilane, phenyl trimethoxysilane, phenylmethyl dimethoxysilane, vinyl triethoxysilane, vinyl-tris (β-methoxy ethoxy)silane, vinyl triacetoxysilane, γ-methacryloxypropyl trimethoxysilane, γ-aminopropyl triethoxysilane, N-β-(aminoethyl)-γ-aminopropyl trimethoxysilane, N-bis(β-hydroxyethyl)-γ-aminopropyl triethoxysilane, N-β-(aminoethyl)-γ-aminopropyl(methyl) dimethoxysilane, γ-chloropropyl trimethoxysilane, γ-mercaptopropyl trimethoxysilane and 3,3,3-trifluoropropyl trimethoxysilane. These compounds may be used either independently of one another or in the form of a mixture of two or more members. Of the members of the group of components (B), the colloidal silica is a colloid solution having a ultra-fine powder of silicic anhydride of the stated particle diameter dispersed in a dispersion medium such as, for example, water or an alcoholic dispersion medium, and preferably has a particle diameter within the range of from 1 to 100 milimicrons. It is produced by a known method and is available on the market.

Examples of organic titanium compounds which are usable in the present invention as one of the group of components (B) include alkoxy titanates such as tetrabutoxy titanate, tetraisopropoxy titanate and tetrakis(2-ethylhexoxy) titanate and alkoxy titanate polymers as polycondensates thereof; titanium acylates such as tetrastearyl titanate and tributoxymonostearyl titanate; titanium chelates such as diisopropoxy-bis(acetylacetone) titanate, dibutoxy-bis (triethanolamine) titanate, dihydroxy-bis(lactic acid) titanate and tetraoxyethylene glycol titanate and hydrolyzates thereof.

Use of one or more members from the group of components (B) mentioned above in conjunction with the component (A) imparts improved weatherability or dyeability to the produced article. Combined use of the hydrolyzate of an organic silicon compound represented by the general formula (2) and a colloidal silica as two members of the group of components (B) in conjunction with the component (A) enables the formed article to exhibit improved appearance and rigidity after a weather test. When, of the group of components (B), use of at least one member selected from the group consisting of colloidal silica and organic titanium compounds in conjunction with the component (A) enables the cured coat on the produced article to be easily dyed by an ordinary method using a disperse dye.

One or more hydrolyzates selected from the group of epoxy group-containing silicon compounds represented by the aforementioned general formula (1) to be used as the component (A) and one or more hydrolyzates selected from the group of organic silicon compounds represented by the aforementioned general formula (2) to be used as the component (B) respectively in the present invention contain hydroxyl groups resulting from partial or whole substitution of alkoxy groups, alkoxy-alkoxy groups or acyloxy groups present in the silicon compounds and natural condensates formed partially between the hydroxy groups produced by the substitution. These hydrolyzates are obtained by hydrolyzing the corresponding compounds in a mixed solvent such as is formed of water with an alcohol, in the presence of an acid, as is well known in the art. When the silicon compounds represented by the aforementioned general formulas (1) and (2) are used in their unhydrolyzed form in this invention, the cured coat on the produced article yields to the phenomenon of blushing and exhibits insufficient abrasion resistance. When the silicon compound and titanium compound represented by the general formulas (1) and (2) are to be used in the form of hydrolyzates, better results are obtained more often when they are mixed and simultaneously subjected to hydrolysis than otherwise.

The ratio of the amount of the component (A) to that of the component (B) to be used in this invention is such that the total amount of the component (B) falls within the range of from 1 to 567 parts by weight [in solids content calculated as $R^4{}_c\text{—Si—}O_{(4-c)/2}$ in the case of an organic silicon compound represented by the general formula (2), in solids content calculated as $SiO_2$ in the case of colloidal silica, or in solids content calculated as $R^{12}{}_d\text{—Ti—}O_{(4-d)/2}$ (where, $R^{12}$ stands for an unhydrolyzed group containing no hydroxyl group and d for an integer of 1 to 4)]based on the total of 100 parts by weight of the component (A) [in solids content calculated as

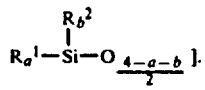

In the composition particularly desirable for the purpose of improving the weather resistance, the amount of the hydrolyzate of the organic silicon compound of the general formula (2) falls within the range of from 56 to 550 parts by weight and that of the colloidal silica of a particle diameter of 1 to 100 mμ within the range of from 4 to 334 parts, with the total amount of the component (B) falling within the range of from 60 to 567 parts, based on 100 parts by weight of the total amount of the component (A). In the preferred composition, the amount of the hydrolyzate of the organic silicon compound represented by the general formula (2) falls within the range of from 105 to 430 parts by weight and that of the colloidal silica within the range of from 16 to 200 parts, with the total amount of the component (B) falling within the range of from 121 to 473 parts by weight, based on 100 parts by weight of the total amount of the component (A). In the composition which provides easy dyeing of the cured coat, the total amount of the component (B) comprising one or more members selected from the group consisting of colloidal silica and organic titanium compounds falls within the range of from 1 to 150 parts by weight, based on 100 parts by weight of the amount of the component (A). Preferably, the total amount of the component (B) comprising one or more members selected from the group consisting of colloidal silica and organic titanium compounds falls within the range of from 3 to 70 parts by weight, based on 100 parts by weight of the component (A). When the total amount of the component (B) is less than 1 part by weight, the effect of the addition of this component falls short of the expected level. When it exceeds 567 parts by weight, the coat exhibits very poor adhesiveness to the substrate and tends to sustain cracks easily.

Now, the curing catalyst on account of which the present invention enjoys one salient advantage that the coating composition produced thereby shows a long pot life, amply rigidifies quickly at a relatively low temperature and exhibits satisfactory adhesiveness to substrates, will be described in detail below. The compounds enumerated below have heretofore been well known as curing catalysts for epoxy group-containing silicon compounds: Perchloric acid, hydrochloric acid, nitric acid, phosphoric acid, sulfuric acid, sulfonic acid, para-toluene sulfonic acid, boron trifluoride and complexes thereof with electron donors; Lewis acids such as $SnCl_4$, $ZnCl_3$, $FeCl_3$, $AlCl_3$, $SbCl_5$ and $TiCl_4$ and complexes thereof; metal salts of organic acids such as sodium acetate, zinc naphthenate, cobalt naphthenate, zinc octoanate and tin octoanate; metal salts of borofluorides such as zinc borofluoride and tin borofluoride; organic esters of boric acid such as ethyl borate and methyl borate; alkalis such as sodium hydroxide and potassium hydroxide; titanates such as tetrabutoxy titanate and tetraisopropoxy titanate; metal acetyl acetonates such as chromium acetyl acetonate, titanyl acetyl acetonate, aluminum acetyl acetonate, cobalt acetyl acetonate and nickel acetyl acetonate; and amines such as n-butylamine, di-n-butylamine, tri-n-butylamine, guanidine, biguanide and imidazol. All these compounds have varying shortcomings.

For example, perchloric acid is an active catalyst and, consequently, the coating composition using it has an extremely short pot life and the cured coat formed thereof is heavily colored. Bronsted acids such as paratoluene sulfonic acid and boron trifluoride monoethylamine complexes and complexes thereof with electron donors; Lewis acids such as $SnCl_4$ and $ZnCl_3$; metal salts of organic acids such as zinc naphthenate, cobalt naphthenate, zinc octoanate and tin octoanate; alkalis such as sodium hydroxide and potassium hydroxide; titanates such as tetrabutoxy titanate and tetra-isopropoxy titanate; chromium acetyl acetonate; and amines such as n-butylamine, di-n-butylamine, tri-n-butylamine and imidazol are not practicable because they must be heated at elevated temperatures for long periods of time in order to be amply cured. Coats formed of compositions using zinc borofluoride, tin borofluoride, etc. offer no sufficient resistance to water and, therefore, are deprived of rigidity upon immersion in hot water. A coat containing aluminum acetyl acetonate exhibits poor surface rigidity and poor adhesiveness to substrates.

In the light of the unsatisfactory state of affairs mentioned above, the inventors launched a study in search of a curing catalyst which enables a coating composition to enjoy a long pot life, rigidify quickly at a relatively low temperature and exhibit satisfactory adhesiveness to substrates. They have, consequently, found that latent catalysts including salts of inorganic acids and carboxylic acids such as ammonium perchlorate, ammonium chloride, ammonium sulfate, ammonium nitrate and sodium acetate, higher aliphatic fluorosulfonates and higher aliphatic fluorosulfonylates suffice for the purpose. Selection of a specially desirable curing catalyst from among those enumerated above depends on the particular composition in which the catalyst is to be contained and on the particular use to which the composition is put. The most desirable of them all is ammonium perchlorate. The amount in which the curing catalyst is to be used is within the range of from 0.05 to 10% by weight, preferably from 0.1 to 5% by weight, based on the total amount of the solids [component (A)+component (B)] of the composition. Composition include alcohols, ketones, esters, ethers, cellosolves, halides, carboxylates and aromatic compounds. One member or a mixture of two or more members selected from the group of solvents mentioned above may be used. It is particularly desirable to use one member or a mixture of two or more members selected from the group consisting of lower alcohols such as methanol, ethanol, propanol, iso-propanol and butanol; cellosolves such as methyl cellosolve, ethyl cellosolve and butyl cellosolve; lower alkyl carboxylic acid such as formic acid, acetic acid and propionic acid; aromatic compounds such as toluene and xylene; and esters such as ethyl acetate and butyl acetate.

Optionally for the purpose of providing a smooth overcoat, a flow control agent made of a block copolymer of an alkylene oxide and dimethyl siloxane such as, for example, NUC Silicone Y-7006 (a proprietary product) from Nippon Unicar Company, may be incorporated in the coating composition. The amount of the flow control agent to be added need not be very large to manifest its effect and, generally, suffices in the range of from 0.01 to 5% by weight, preferably from 0.03 to 3% by weight, based on the total weight of the coating composition. Optionally, an antioxidant, an ultraviolet ray absorbent, etc. may be incorporated in small amounts.

The overcoating of a shaped substrate of polycarbonate type resin with the overcoating composition is accomplished by any of the ordinary coating methods such as the immersion method, the spray method, the roller coating method and the flow coating method, i.e. by applying the overcoating composition to the substrate on which the undercoating composition to be described more fully hereinafter has been deposited and cured in advance, then treating to cure the overcoat at a temperature not less than 70° C. and not more than the deforming temperature of the substrate (130° C., for example) for a period of from 20 minutes to 5 hours. Consequently, the shaped substrate acquires a coat excelling in abrasion resistance, adhesiveness, hot water resistnace and weather resistance.

The overcoat thus formed is desired to have a thickness within the range of from 1 to 30 microns, preferably from 3 to 15 microns. When the thickness is less than 1 micron, the coat offers no sufficient abrasion resistance. When it exceeds 30 microns, the coat tends to sustain cracks.

The composition of the present invention can be applied to substrates of plastic materials such as polycarbonate, polymethyl methacrylate, polystyrene and polyvinyl chloride. Even in the case of a substrate which permits adhesion of a coating composition only with difficulty, a priming treatment given to the substrate enables the coating composition to adhere fast to the substrate. The coated shaped articles thus produced are used as glasses' lens, ski goggles, doors, automobile windows and partition walls, for example.

Optionally, the coated shaped articles of polycarbonate type resin may be produced as colored by dyeing their overcoat layers. The dyeing can be accomplished, for example, by preparing a dye bath having an ordinary disperse dye, a dispersant, a pH adjusting agent, etc. dissolved in water and keeping the shaped articles in the dye bath at a temperature within the range of from 85° to 95° C. for a period of from 5 to 30 minutes. Thus, there are obtained dyed articles which excel in abrasion resistance.

Now, the present invention will be described more specifically with reference to working examples. This invention is not limited by these examples. Wherever parts and percents are mentioned in the ensuing examples, and elsewhere herein, they are meant as parts by weight and percents by weight respectively.

The properties of the coats which are to be indicated in the examples have been rated as shown below Abrasion resistance; A given sample was tested for resistance to scratches by having the surface rubbed with steel wool, #0000. This property was rated on the following scale.

A-No scratch sustained even under strong rubbing.
B-Scratches sustained slightly under strong rubbing.
C-Scratches sustained even under weak rubbing.

Adhesiveness: This property was determined by the so-called cross cut tape test, i.e. by cutting 11 parallel lines each in two perpendicularly crossing directions with a knife at fixed intervals of 1 mm on the surface of the coat film of a given sample to product a total of 100 squares, applying an adhesive tape of cellophone to the cut squares, peeling the tape, and taking count of the squares on which the coat film remains fast. The adhesiveness was reported by the number so found.

Hot water resistance: This property was determined by keeping a given sample in boiling water for one hour and examining the coat film at the end of the standing.

Heat resistance: This property was determined by keeping a given sample in a hot-air furnace at a temperature of 100° C. for 100 hours and examining the coat film at the end of the standing.

Chemical resistance: This property was determined by keeping a given sample in the chemicals indicated below at room temperature for 100 hours and examining the coat film at the end of the standing: 3% sulfuric acid, 1% sodium hydroxide, 95% ethanol, acetone, ethyl acetate, carbon tetrachloride, toluene, n-heptane and 10% sodium chloride solution.

EXAMPLE 1

In 49.0 parts of isopropyl alcohol, 86.4 parts of γ-glycidoxypropyl trimethoxysilane and 53.3 parts of methyl trimethoxysilane were dissolved. In the resultant solution, 61.4 parts of an aqueous 0.1 N hydrochloric acid solution was gradually added thereto and agitated at room temperature to effect hydrolysis of the silanes. Thereafter, the reaction mixture was left standing at room temperature for more than 20 hours to be fully aged. The solution thus obtained was colorless and transparent and was found to contain 24.5% of γ-glycidoxypropyl trimethoxysilane hydrolyzate calculated as

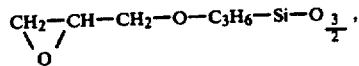

and 10.5% of methyl trimethoxysilane hydrolyzate calculated as $CH_3SiO_3$. A composition was produced by dissolving 88.4 parts of ethyl cellosolve, 0.42 part of ammonium perchlorate and a smal amount of a flow control agent in 240 parts of the cohydrolyzate of γ-glycidoxypropyl trimethoxysilane and methyl trimethoxysilane obtained as described above.

The composition prepared was applied to the a CR-39 flat plate (diethylene glycol bis allyl carbonate polymer) which had been cleaned in advance, and then dried and cured in a hot-air furnace at 130° C. for 60 minutes. When the overcoat layer was cured, its thickness was 5 microns. The coated film thus obtained was transparent. The abrasion resistance was A, the adhesiveness was 100/100, and the hot water resistance and the heat resistance were good. Even after the test for hot water resistance, the abrasion resistance was A and the adhesiveness was 100/100. In all the chemicals, th product showed high resistance. After the test, it retained its good appearance intact.

EXAMPLE 2

In 76.3 parts of isopropyl alcohol, 98.8 parts of γ-glycidoxypropyl trimethoxysilane and 28.4 parts of dimethyl dimethoxysilane were dissolved. In the solution, 46.6 parts of an aqueous 0.1 N hydrochloric acid solution was gradually added and stirred at room temperature to effect hydrolysis. Thereafter, the mixture was left standing at room temperature for more than 20 hours to be fully aged. The resultant solution was colorless and transparent and was found to contain 28.0% of γ-glycidoxypropyl trimethoxysilane hydrolyzate calculated as

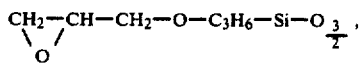

and 7.0% of dimethyl dimethoxysilane hydrolyzate calculated as $(CH_3)_2SiO$.

A composition was obtained by dissolving 88.4 parts of ethyl cellosolve, 0.42 part of ammonium perchlorate and a small amount of a flow control agent in 240 parts of the solution of cohydrolyzate of γ-glycidoxypropyl trimethoxysilane and dimethyl dimethoxysilane obtained as described above.

The composition obtained above was applied to a CR-39 flat plate which had been cleaned in advance and then dried and cured in a hot-air furnace at 130° for 60 minutes.

The coated film was transparent. The abrasion resistance was A, the adhesiveness was 100/100 and the hot water resistance and the heat resistance were both good. Even after all these tests, the article retained its good appearance intact and the adhesiveness was invariably 100/100. After 500 hours of a sunshine weather meter test, the system of the present example using γ-glycidoxypropyl trimethoxysilane, one member of the group of components (A), and dimethyl dimethoxysilane, one member of the group of components (B), showed a better appearance than a system using γ-glycidoxypropyl trimethoxysilane alone.

EXAMPLE 3

In 43.9 parts of iso-propyl alcohol, 74.5 parts of γ-glycidoxypropyl trimethoxysilane, 53.5 parts of methyl trimethoxysilane and 14.3 parts of dimethyl dimethoxysilane were dissolved. In the resultant solution, 63.8 parts of an aqueous 0.1 N hydrochloric acid solution was gradually added and stirred at room temperature to effect hydrolysis. Thereafter, the resultant mixture was left standing at room temperature for more than 20 hours to be fully aged. The resultant solution was colorless and transparent. It was found to contain 21% of γ-glycidoxypropyl trimethoxysilane hydrolyzate calculated as

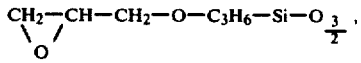

10.5% of of methyl trimethoxysilane hydrolyzate calculated as $CH_3SiO_{3/2}$, and 3.5% of dimethyl dimethoxysilane hydrolyzate calculated as $(CH_3)_2SiO$.

A composition was obtained by dissolving 88.4 parts of ethyl cellosolve, 0.4 part of ammonium perchlorate and a small amount of a flow control agent in 240 parts of the solution of cohydrolyzate of γ-glycidoxypropyl trimethoxysilane, methyl trimethoxysilane and dimethyl dimethoxysilane.

The composition obtained as described above was applied to a CR-39 flat plate which and been cleaned in advance, and then dried and cured in hot-air furnace at 130° C. for 60 minutes. The coated film thus produced was transparent. The abrasion resistance was A, the adhesiveness was 100/100 and the hot water resistance and the heat resistance were both good. Even after the test for hot water resistance, the abrasion resistance was A and the adhesiveness was 100/100.

EXAMPLE 4

In 56.3 parts of iso-propyl alcohol, 98.9 parts of γ-glycidoxypropyl trimethoxysilane, 69.4 parts of tetraethoxysilane and 26.6 parts of methyl triethoxysilane were dissolved. In the resultant solution, 82.1 parts of an aqueous 0.05 N hydrochloric acid solution was gradually added and stirred at room temperature to effect hydrolysis. Thereafter, the reaction mixture was left standing at room temperature for more than 20 hours to be fully aged. The resultant solution was colorless and transparent and was found to contain 21.0% of γ-glycidoxypropyl trimethoxysilane hydrolyzate calculated as

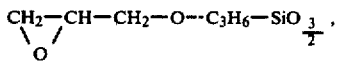

6.0% of tetraethoxysilane hydrolyzate calculated as $SiO_2$, and 3.0% of methyl triethoxysilane hydrolyzate calculated as $CH_3SiO_3$. A composition was obtained by dissolving 50 parts of ethyl cellosolve, 0.6 part of ammonium perchlorate and a small amount of a flow control agent in 250 parts of the solution of cohydrolyzate of γ-glycidoxypropyl trimethoxysilane, tetraethoxysilane and methyl triethoxysilane obtained as described above.

This composition was applied to a CR-39 flat plate which had been cleaned in advance and then was dried and cured in a hot-air furnace at 110° C. for 90 minutes. The coated film thus obtained was transparent. The abrasion resistance was A and the adhesiveness was 100/100. Even after the test for hot water resistance, the article retained its appearance intact.

EXAMPLE 5

γ-Glycidoxypropyl trimethoxysilane (236 parts) and 280 parts of vinyl-tris(β-methoxyethoxy)silane were mixed. In the resultant mixture, 160 parts of an aqueous 0.05 N hydrochloric acid solution was gradually added and stirred at room temperature to effect hydrolysis. The resultant mixture was left standing at room temperature for more than 20 hours to be fully aged. The solution thus obtained was light yellow and transparent and was found to contain 24.6% of γ-glycidoxypropyl trimethoxysilane hydrolyzate calculated as

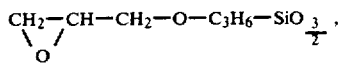

and 11.7% of vinyl-tris(β-methoxyethyoxy)silane hydrolyzate calculated as $CH_2=CH-Si-O_3$. A composition was obtained by dissolving 67.8 parts of ethyl cellosolve, 0.54 part of ammonium perchlorate and a small amount of a flow control agent in 150 parts of the solution of cohydrolyzate of γ-glycidoxypropyl trimethoxysilane and vinyl-tris(β-methoxyethoxy)silane obtained as described above.

This composition was applied to a CR-39 flat plate which had been cleaned in advance, and then dried and cured in a hot-air furnace at 130° C. for 60 minutes to be fully aged. The resultant coated film thus obtained was transparent. The abrasion resistance was A. After the test for hot water resistance, the article retained its appearance intact and exhibited an adhesiveness of 100/100.

EXAMPLE 6

In 76.0 parts of iso-propyl alcohol, 91.8 parts of γ-glycidoxypropyl trimethoxysilane and 68.9 parts of γ-mercaptopropyl trimethoxysilane were dissolved. In the resultant solution, 49.0 parts of an aqueous 0.05 N hydrochloric acid solution was gradually added and stirred at room temperature to effect hydrolysis. Thereafter, the resultant mixture was left standing at room temperature for more than 20 hours to be fully aged. The solution thus obtained was colorless and transparent and found to contain 22.8% of γ-glycidoxypropyl trimethoxysilane hydrolyzate calculated as

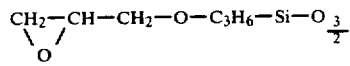

and 12.3% of γ-mercaptopropyl trimethoxysilane hydrolyzate calculated as $HS-C_3H_6-SiO_{3/2}$. A composition was prepared by dissolving 40.4 parts of ethyl cellosolve, 0.18 part of ammonium perchlorate and a small amount of a flow control agent in 100 parts of the solution of cohydrolyzate of γ-glycidoxypropyl trimethoxysilane and γ-mercaptopropyl trimethoxysilane obtained as described above.

This composition was applied to a CR-39 flat plate which had been cleaned in advance, and then dried and cured in a hot-air furnace at 130° C. for 60 minutes to be cured. The coated film thus obtained was transparent and exhibited high abrasion resistance, hot water resistance and adhesiveness.

EXAMPLE 7

In 80.0 parts of iso-propyl alcohol, 111.1 parts of β-(3,4-epoxycyclohexyl)ethyl trimethoxysilane and 40.6 parts of methyl trimethoxysilane were dissolved. In the resultant solution, 54.0 parts of an aqueous 0.01 N hydrochloric acid solution was gradually added and stirred at room temperature to effect hydrolysis. Thereafter, the resultant reaction mixture was left standing at room temperature for more than 20 hours to be fully aged. The solution thus produced was colorless and transparent and was found to contain 28.0% of β-(3,4-epoxycyclohexyl)ethyl trimethoxysilane hydrolyzate calculated as

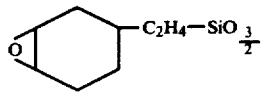

and 7.0% of methyl trimethoxysilane hydrolyzate calculated as $CH_3-Si-O_3$. A composition was prepared by dissolving 40.0 parts of ethyl cellosolve, 0.18 part of ammonium perchlorate and a small amount of a flow control agent in 100 parts of the solution of cohydrolyzate of β-(3,4-epoxycyclohexyl)ethyl trimethoxysilane and methyl trimethoxysilane obtained as described above.

This composition was applied to a CR-39 flat plate which had been cleaned in advance, and then dried and cured at 130° C. for 60 minutes. The coated film thus obtained was transparent. The abrasion resistance was A, the adhesiveness was 100/100 and the hot water resistance and the heat resistance were both good. After the test for hot water resistance, the abrasion resistance and the adhesiveness were A and 100/100 respectively. In all the chemicals, the article exhibited high resistance and retained its good appearance intact.

CONTROL 1:

A coating composition containing γ-glycidoxypropyl trimethoxysilane and γ-chloropropyl trimethoxysilane which had not been hydrolyzed in advance was prepared as follows. In 102.9 parts of ethyl cellosolve, 70.6 parts of γ-glycidoxypropyl trimethoxysilane and 76.5 parts of γ-chloropropyl trimethoxysilane were dissolved. A composition was obtained by dissolving 0.8 part of ammonium perchlorate and a small amount of a flow control agent in the resultant solution.

This composition was applied to a CR-39 that plate which had been cleaned in advance, and then dried and cured in a hot-air furnace at 130° C. for 60 minutes. The coat thus produced was in a flushed condition. The abrasion resistance of the coat was rated as B.

EXAMPLE 8

The composition prepared in Example 2 was left standing at room temperature for one month. After the standing, it was applied to a CR-39 flat plate which had been cleaned in advance as in Example 2, and then was dried and cured in a hot-air furnace at 130° C. for 90 minutes. The coat thus obtained exhibited satisfactory properties equalling those obtained in Example 2.

EXAMPLE 9

In 68.4 parts of iso-propyl alcohol, 100.0 parts of γ-glycidoxypropyl trimethoxysilane was dissolved. In the resultant solution, 34.2 parts of an aqueous 0.1 N hydrochloric acid solution was gradually added and stirred at room temperature to effect hydrolysis. Thereafter, the reaction mixture was left standing at room temperature for more than 20 hours to be fully aged. The resultant solution was colorless and transparent and was found to contain 35% of γ-glycidoxypropyl trimethoxysilane hydrolyzate calculated as

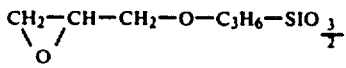

A coating composition was prepared by adding 42 parts of colloidal silica (having a solids content of 20%, produced by Nissan Chemical Industry Co., Ltd., and marketed under trademark designation of "Snowtex-C"), 10.1 parts of ethyl cellosolve, 0.28 part of ammonium perchlorate, and a small amount of a flow control agent to 56 parts of the solution of γ-glycidoxypropyl trimethoxysilane hydrolyzate obtained as described above.

This coating composition was applied to a CR-39 flat plate which had been cleaned in advance, and then dried and cured in a hot-air furnace at 130° C. for 60 minutes. The coated film thus obtained was transparent. The abrasion resistance was A, the adhesiveness was 100/100, and the hot water resistance and the heat resistance were both good. Even after the test for hot water resistance, the abrasion resistance and the adhesiveness were A and 100/100 respectively.

EXAMPLE 10

An coating composition was prepared by adding 66.7 parts of colloidal silica (having a solids content of 30%, made by Shokubai Kasei Industry Co., Ltd. and marketed under trademark designation of "Organosol"), 43.1 parts of ethyl cellosolve, 0.25 part of ammonium perchlorate and a small amount of a flow control agent to 85.7 parts of the solution of γ-glycidoxypropyl trimethoxysilane hydrolyzate obtained in Example 9. This coating composition was applied to a CR-39 flat plate which had been cleaned in advance, and was dried and cured in a hot-air furnace at 130° C. for 60 minutes. The coated film thus obtained was transparent. The abrasion resistance was A, the adhesiveness was 100/100, and the hot water resistance, the heat resistance and the chemical resistance were all good. After these tests, the product retained its good appearance intact.

EXAMPLE 11

Eighty (80) parts of γ-glycidoxypropyl trimethoxysilane, 144 parts of methyl trimethoxysilane, 71 parts of colloidal silica (having a solids content of 20%, made by Nissan Chemical Industry Co., Ltd., and market under trademark designation of "Snowtex-C") and 170 parts of an aqueous 0.1 N hydrochloric acid solution were mixed and refluxed at 80° to 85° C. for 2 hours to effect hydrolysis. The resultant solution was found to contain 12.2% of γ-glycidoxypropyl trimethoxysilane hydrolyzate calculated as

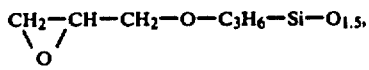

15.3% of methyltrimethoxysilane hydrolyzate calculated as $CH_3SiO_{1.5}$, and 3.1% of colloidal silica calculated as $SiO_2$. A coating composition was obtained by adding 73 parts of ethyl cellosolve, 1.3 parts of ammonium perchlorate and a small amount of a flow control agent to 410 parts of the solution of three-component cohydrolyzate obtained as described above.

The coating composition prepared in the above manner was applied to a CR-39 flat plate which had been cleaned in advance and then dried and cured in the hot-air furnace at 130° C. for 60 minutes. The coated film thus obtained was transparent. The abrasion resistance was A, the adhesiveness was 100/100 and the heat resistance was good. Even after the test for hot water resistance, the abrasion resistance and the adhesiveness were A and 100/100 respectively. After 500 hours of a sunshine weather meter test the product exhibited very good appearance, rigidity and adhesiveness. To all the chemicals, the product exhibited high resistance. After the test for chemical resistance, it retained its good appearance intact.

EXAMPLE 12

Sixty (60) parts of γ-glycidoxypropyl trimethoxysilane, 173 parts of methyl trimethoxysilane, 71 parts of colloidal silica (having a solids content of 20%, made by Nissan Chemical Industry Co., Ltd, and marketed under trademark designation of "Snowtex-C") and 190 parts of an aqueous 0.1 N hydrochloric acid solution were mixed and refluxed at 80° to 85° C. for 2 hours to effect hydrolysis. The resultant solution contained 8.6% of γ-glycidoxypropyl trimethoxysilane hydrolyzate calculated as

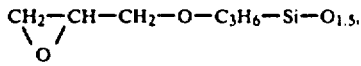

17.3% of methyl trimethoxysilane hydrolyzate calculated as $CH_3SiO_{1.5}$ and 2.9% of colloidal silica calculated as $SiO_2$.

A coating composition was obtained by adding 47 parts of ethyl cellosolve, 1.3 parts of ammonium perchlorate and a small amount of a flow control agent to 436 parts of the three-component cohydrolyzate solution obtained as described above. This coating composition was applied to a CR-39 flat plate which had been cleaned in advance, and then dried and cured in a hot-air furnace at 130° C. for 60 minutes.

The coated film thus obtained was transparent. The hot water resistance and the heat resistance were both good. Even after the test for hot water resistance, the abrasion resistance and the adhesiveness were A and 100/100 respectively. After 500 hours of a sunshine weather meter test, the product exhibited very good appearance, rigidity and adhesiveness.

EXAMPLE 13

Forty (40) parts of γ-glycidoxypropyl trimethoxysilane, 202 parts of methyl trimethoxysilane, 71 parts of colloidal silica (having a solids content of 20%, made by Nissan Chemical Industry Co., Ltd. and marketed under trademark designation of "Snowtex-C") and 211 parts of an aqueous 0.1 N hydrochloric acid solution were mixed and fluxed at 80° to 85° for 1 hour to effect hydrolysis. The resultant solution contained 5.4% of γ-glycidoxypropyl trimethoxysilane hydrolyzate calculated as

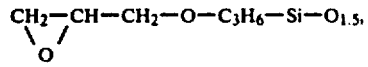

19.0% of methyl trimethoxysilane hydrolyzate calculated as $CH_3SiO_{1.5}$ and 2.7% of colloidal silica calculated as $SiO_2$.

A coating composition was obtained by adding 20 parts of ethyl cellosolve, 1.3 parts of ammonium perchlorate and a small amount of a flow control agent to 463 parts of the solution of three-component cohydrolyzate obtained as described above. This coating composition was applied to a CR-39 flat plate which had been cleaned in advance, and then dried and cured in a hot-air furnace at 120° C. for 60 minutes. The abrasion resistance and the adhesiveness of the cured coated film thus obtained were A and 100/100 respectively. The product exhibited its good appearance, rigidity and adhesiveness intact even after 500 hours of a sunshine weather meter test.

EXAMPLE 14

Sixty (60) parts of γ-glycidoxypropyl trimethoxysilane, 144 parts of methyl trimethoxysilane, 142 parts of colloidal silica (having a solids content of 20%, made by Nissan Chemical Industry Co., Ltd. and marketed under trademark designation of "Snowtex-C") and 98 parts of an aqueous 0.1 N hydrochloric acid solution were mixed and refluxed at 80° to 85° C. for 2 hours to effect hydrolysis. The resultant solution contained 9.6% of γ-glycidoxypropyl trimethoxysilane hydrolyzate calculated as

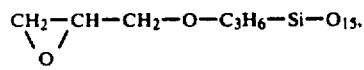

16.0% of methyl methoxysilane hydrolyzate calculated as CH$_3$SiO$_{1.5}$ and 6.4% of colloidal silica calculated as SiO$_2$.

A coating composition was obtained by adding 66 parts of ethyl cellosolve, 1.3 parts of ammonium perchlorate and a small amount of a flow control agent to 417 parts of the solution of three-component cohydrolyzate obtained as described above. This coating composition was applied to a CR-39 flat plate which had been cleaned in advance, and then dried and cured in a hot-air furnace at 120° C. for 60 minutes. The abrasion resistance and the adhesiveness of the cured coated film thus obtained were A and 100/100 respectively. The product exhibited its good appearance, rigidity and adhesiveness intact even after 500 hours of a sunshine weather meter test.

EXAMPLE 15

To 77 parts of iso-propyl alcohol were added 60 parts of γ-glycidoxypropyl trimethoxysinalne, 115 parts of methyl trimethoxysilane, 213 parts of colloidal silica (having a solids content of 20%, made by Nissan Chemical Industry Co., Ltd. and marketed under trademark designation of "Snowtex-C") and 5 parts of an aqueous 1N hydrochloric acid solution. The mixture was refluxed at 80° to 85° C. for 2 hours. The resultant solution contained 9.1% of γ-glycidoxypropyl trimethoxysilane hydrolyzate calculated as

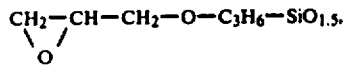

12.1% of methyl trimethoxysilane hydrolyzate calculated as CH$_3$SiO$_{1.5}$ and 9.1% of colloidal silica calculated as SiO$_2$.

A coating composition was obtained by adding 66 parts of ethyl cellosolve, 1.3 parts of ammonium perchlorate and a small amount of a flow control agent to 417 parts of the solution of three-component cohydrolyzate obtained as described above. This coating composition was applied to a CR-39 flat plate which had been cleaned in advance, and then dried and cured in a hot-air furnace at 120° C. for 60 minutes. The abrasion resistance and the adhesiveness of the cured coated film thus obtained were A and 100/100 respectively. The product exhibited its good appearance, rigidity and adhesiveness intact even after 500 hours of a sunshine weather meter test.

EXAMPLE 16

A mixture of 39 parts of γ-glycidoxypropyl trimethoxysilane, 2.9 parts of 3,3,3-trifluoropropyl trimethoxysilane, 110 parts of methyl trimethoxysilane, 75 parts of colloidal silica (having a solids content of 20%, made by Nissan Chemical Industry Co., Ltd. and marketed under trademark designation of "Snowtex-C") and 100 parts of an aqueous 0.1 N hydrochloric acid solution was refluxed at 80° to 85° C. for 2 hours. The resultant solution contained 8.5% of γ-glycidoxypropyl trimethoxysilane hydrolyzate calculated as

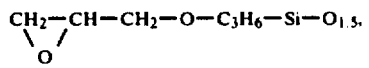

0.6% of 3,3,3-trifluoropropyl methoxysilane hydrolyzate calculated as CF$_3$C$_2$H$_4$SiO$_{1.5}$, 16.7% of methyl trimethoxysilane hydrolyzate calculated as CH$_3$SiO$_{1.5}$ and 4.6% of colloidal silica calculated as SiO$_2$.

A coating composition was obtained by adding 49 parts of ethyl cellosolve, 0.9 part of ammonium perchlorate and a small amount of a flow control agent to 310 parts of the solution of four-component cohydrolyzate obtained as described above. This coating composition was applied to a CR-39 flat plate which had been cleaned in advance, and then dried and cured in a hot-air furnace at 120° C. for 60 minutes. The abrasion resistance and the adhesiveness of the cured coated film thus obtained were A and 100/100 respectively. The product exhibited its good appearance, rigidity and adhesiveness intact even after 500 hours of a sunshine weather meter test.

CONTROL 2:

Ten (10) parts of γ-glycidoxypropyl trimethoxysilane, 144 parts of methyl trimethoxysilane, 320 parts of colloidal silica (having a solids content of 20%, made by Nissan Chemical Industry Co., Ltd. and marketed under trademark designation of "Snowtex-C") and 6 parts of an aqueous 0.1 N hydrochloric acid solution were mixed and refluxed at 80° to 85° C. for 2 hours to effect hydrolysis. The resultant solution contained 1.5% of γ-glycidoxypropyl trimethoxysilane hydrolyzate calculated as

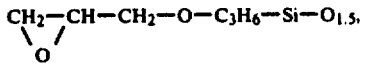

14.8% of methyl trimethoxysilane hydrolyzate calculated as CH$_3$SiO$_{1.5}$ and 13.3% of collidal silica calculated as SiO$_2$. Two kinds of compositions were obtained by adding 82 parts of ethyl cellosolve, a small amount of a flow control agent, and 1.3 parts of ammonium perchlorate or 0.8 part of sodium acetate as a curing catalyst to 400 parts of the solution of three-component cohydrolyzate obtained as described above. These coating compositions were applied to a CR-39 flat plate which had been cleaned in advance, and then dried and cured in a hot-air furnace at 130° C. for 60 minutes. The coated films thus obtained were excellent in rigidity but were deficient in adhesiveness. After 500 hours of a sunshine weather meter test, the coats peeled off the substrates.

EXAMPLE 17

A mixture of 944.4 parts of γ-glycidoxypropyl trimethoxysilane, 835.2 parts of colloidal silica (having a solids content of 20%, made by Nissan Chemical Industry Co., Ltd. and marketed under trademark designation of "Snowtex-C") and 8.0 parts of an aqueous 1.2 N hydrochloric acid solution was refluxed at 80° C. for 5 hours. From the resultant solution, 168 parts of the solvent was expelled through fractional distillation at 80° to 90° C. The resultant solution contained 41% of γ-glycidoxypropyl trimethoxysilane hydrolyzate calculated as

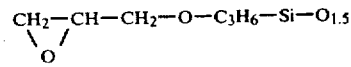

and and 10% of colloidal silica calculated as $SiO_2$. A coating compostion was obtained by adding 149 parts of ethyl cellosolve, 0.75 part of ammonium perchlorate and a small amount of a flow control agent to 141.0 parts of the solution of γ-glycidoxypropyl trimethoxysilane containing colloidal silica obtained as described above. This coating composition was applied to a CR-39 flat plate which had been cleaned in advance, and then dried and cured in a hot-air furnace at 120° C. for 1 hour. The coated film thus obtained was dyed by a method indicated below.

The dyeing of the product was accomplished by preparing a dye bath containing an ordinary disperse dye, a dispersant, a pH adjusting agent, etc. in water and keeping the product in the dye bath at 85° to 95° for 20 minutes. The dye product has a good appearance. The percent transmission to visible ray was 65%, the abrasion resistance was A, the adhesiveness was 100/100 and the hot water resistance was also good. The fastness of dye was satisfactory.

EXAMPLE 18

A coating composition was obtained by adding 7.6 parts of tetrabutoxy titanium, 39.4 parts of ethyl cellosolve, 0.18 part of ammonium perchlorate and a small amount of a flow control agent to 100.0 parts of the solution of γ-glycidoxypropyl trimethoxysilane hydrolyzate prepared in Example 9.

This coating composition was applied to a CR-39 flat plate which had been cleaned in advance, and the overcoat was dried and cured in a hot-air furnace at 130° C. for 60 minutes. The coated film was transparent. The abrasion resistance was A, the adhesiveness was 100/100 and the hot water resistance was also good.

EXAMPLE 19

To 120 parts of γ-glycidoxypropyl trimethoxysilane, 9.4 parts of titanium polymer (made by Nippon Soda Co., Ltd. and marketed under trademark designation of "TBT-400") was added while under stirring. In the resultant solution, 27 parts of an aqueous 0.1 N hydrochloric acid solution was gradually added and stirred at room temperature for 3 hours to effect hydrolysis. A coating composition was obtained by adding 184 parts of ethyl cellosolve, 0.8 parts of ammonium perchlorate and a small amount of a flow control agent to 140 parts of the light yellow transparent solution obtained as described above. This coating composition was applied to a CR-39 flat plate which had been cleaned in advance, and then dried and cured in a hot-air furnace at 130° C. for 1 hour. The coated shaped article of CR-39 thus obtained was dyed by the same method as in Example 17. The dyed product had a good appearance. The percent transmission to visible ray was 70%, the abrasion resistance was A, the adhesiveness was 100/100, and the hot water resistance and the dye fastness were both good.

CONTROL 3

Forty-eight (48) parts of ethyl silicate, 24 parts of methyl trimethoxysilane, 8 parts of γ-methacryloxy propyl trimethoxy-silane, 25 parts of water and 7 parts of acetic acid were added into 40 parts of a mixed solvent of isopropanol and n-butanol (1:1, weight ratio), and were stirred for 5 hours under external ice cooling to hydrolyze. After the solution thus obtained was aged for 2 days at an ambient temperature, it was coated on a CR-39 flat plate which has been cleaned in advance, and then dried and cured in a hot-air furnace at 105° C. for 8 hours. Abrasion resistance of the cured coated film thus obtained was C, it was almost impossible to dye by a similar method as Example 17 and cracks occurred.

EXAMPLE 20

A coating composition was obtained by dissolving 60 parts of ethyl cellosolve, 28.4 parts of dichloroethane, 0.42 part of ammonium perchlorate and a small amount of a flow control agent in 240 parts of the solution of cohydrolyzate of γ-glycidoxypropyl trimethoxysilane and methyl trimethoxysilane prepared in Example 1. This coating composition was applied to a sheet of polymethyl methacrylate (made by Sumitomo Chemical Co., Ltd., and marketed under trademark designation of "Sumipex") which had been cleaned in advance, and the coat thus formed was dried and cured in a hot-air furnace at 80° C. for 3 hours. Consequently, there was obtained a transparent coat excelling is abrasion resistance.

What is claimed is:

1. A transparent, abrasion-resistant coating composition having high adhesiveness for transparent polymers, which comprises: as component (A), at least one hydrolyzate selected from the group of epoxy group-containing silicon compounds represented by the general formula (1):

wherein, $R^1$ stands for an organic group containing an epoxy group, $R^2$ for hydrogen atom, a hydrocarbon group having 1 to 6 carbon atoms or vinyl group, $R^3$ for a hydrocarbon group having 1 to 5 carbon atoms, alkoxyalkyl group or acyl group having 1 to 4 carbon atoms, a for an integer of 1 to 3 and b for an integer of 0 to 2, providing that $a+b \leq 3$ is satisfied, said one hydrolyzate being used in an amount of 100 parts by weight (of solids; calculated as

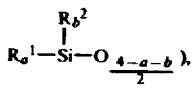

as component (B), at least one member selected from the group consisting of hydrolyzates of organic silicon compounds represented by the general formula (2):

$$R_c^4-Si-(OR^5)_{4-c} \qquad (2)$$

wherein, $R^4$ stands for a hydrocarbon group having 1 to 6 carbon atoms, vinyl group, methacryloxy group, amino group, mercapto group, or organic group containing fluorine or chlorine, $R^5$ for a hydrocarbon group having 1 to 5 carbon atoms, alkoxyalkyl group or acyl group having 1 to 4 carbon atoms and c for an integer of 0 to 3; colloidal silica and organic titanium compounds, said one member being used in an amount within the range of from 1 to 567 parts by weight (of solids, calculated as $R_c^4-Si-O_{(4-c)/2}$ in the case of an organic silicon compound represented by the general formula (2), as $SiO_2$ in the case of colloidal silica or as $R_d^6-Ti-O_{(4-d)/2}$ in the case of an organic titanium compound, wherein $R^6$ stands for an unhydrolyzed group containing no hydroxy group and d for an integer of 1 to 4); and as component (C), a curing catalyst selected from the group consisting of ammonium perchlorate and ammonium chloride.

2. A composition set forth in claim 1, wherein component (B) consists in the hydrolyzate of an organic silicon compound represented by the general formula (2) used in an amount within the range of from 56 to 550 parts by weight and the colloidal silica used in an amount within the range of from 4 to 334 parts by weight, providing that the total of the amounts of the members of component (B) falls within the range of from 60 to 567 parts by weight.

3. A composition set forth in claim 1, wherein (B) consists in at least one member selected from the group consisting of collodial silica and organic titanium compounds used in an amount within the range of from 1 to 150 parts by weight.

4. A composition set forth in claim 1, wherein component (B) consists in the hydrolyzate of an organic silicon compound used in an amount within the range of from 105 to 430 parts by weight and the colloidal silica used in an amount in the range of from 16 to 200 parts by weight, providing that the total of the amounts of the members of component (B) falls within the range of from 121 to 473 parts by weight.

5. A composition set forth in claim 3, wherein component (B) consists in at least one member selected from the group consisting of colloidal silica and organic titanium compounds used in an amount within the range of from 3 to 70 parts by weight.

6. A composition set forth in claim 2, wherein the curing catalyst is used in an amount within the range of from 0.05 to 10% by weight based on the total amount of the component (A) and the component (B) taken as solids.

7. A composition set forth in claim 2, wherein the amount of component (A) is greater than 27%.

8. A composition set forth in claim 4, wherein the amount of component (A) is greater than 27%.

9. A transparent, abrasion-resistant coating composition having high adhesiveness for transparent polymers, which comprises: as component (A), at least one hydrolyzate selected from the group of epoxy group-containing silicon compounds represented by the general formula (1):

 (1)

wherein, $R^1$ stands for an organic group containing an epoxy group, $R^2$ for hydrogen atom, a hydrocarbon group having 1 to 6 carbon atoms or vinyl group, $R^3$ for a hydrocarbon group having 1 to 5 carbon atoms, alkoxyalkyl group or acyl group having 1 to 4 carbon atoms, a for an integer of 1 to 3 and b for an integer of 0 to 2, providing that $a+b \leq 3$ is satisfied, said one hydrolyzate being used in an amount of 100 parts by weight (of solids, calculated as

 (1)

as component (B), at least one member selected from the group consisting of hydrolyzates of organic silicon compounds represented by the general formula (2):

$$R_c^4-Si-(OR^5)_{4-c} \qquad (2)$$

wherein, $R^4$ stand for a hydrocarbon group having 1 to 6 carbon atoms, vinyl group, methacryloxy group, amino group, mercapto group, or organic group containing fluorine or chlorine, $R^5$ for a hydrocarbon group having 1 to 5 carbon atoms, alkoxyalkyl group or acyl group having 1 to 4 carbon atoms and c for an integer of 0 to 3, used in an amount within the range of 56 to 550 parts and colloidal silica used in an amount within the range of from 4 to 334 parts, (of solids, calculated as $R_c^4-Si-(OR^5)_{(4-c)/2}$ in the case of an organic silicon compound represented by the general formula (2), and as $SiO_2$ in the case of colloidal silica), providing that the total amounts of the members of component (B) fall within the range of from 60 to 567 parts; and as component (C), a curing catalyst selected from the group consisting of ammonium perchlorate and ammonium chloride.

10. A composition set forth in claim 9, wherein in component (B), the hydrolyzate of an organic silicon compound is used in an amount within the range of from 105 to 430 parts and the colloidal silica is used in an amount within the range of from 16 to 200 parts, providing that the total of the amounts of members of component (B) fall within the range of from 121 to 143 parts.

11. A composition set forth in claim 9, wherein the amount of component (A) is greater than 27%.

12. A composition set forth in claim 10, wherein the amount of component (A) is greater than 27%.

* * * * *